Dec. 6, 1960 D. D. DAY 2,962,769
AUTOMATIC CONTROL FOR GIN FRONTS
Filed Aug. 22, 1956 6 Sheets-Sheet 1

INVENTOR.
Dewey D. Day
BY
Att'ys

FIG. 2

INVENTOR.
Dewey D. Day

Dec. 6, 1960           D. D. DAY           2,962,769

AUTOMATIC CONTROL FOR GIN FRONTS

Filed Aug. 22, 1956           6 Sheets-Sheet 4

Inventor
Dewey D. Day

Dec. 6, 1960     D. D. DAY     2,962,769
AUTOMATIC CONTROL FOR GIN FRONTS
Filed Aug. 22, 1956     6 Sheets-Sheet 6

Inventor
Dewey D. Day
by
Att'ys

United States Patent Office 2,962,769
Patented Dec. 6, 1960

1

2,962,769

AUTOMATIC CONTROL FOR GIN FRONTS

Dewey D. Day, Dallas, Tex., assignor to The Murray Company of Texas, Inc., Dallas, Tex., a corporation of Delaware Filed Aug. 22, 1956, Ser. No. 605,526

21 Claims. (Cl. 19—55)

This invention pertains to cotton gins or similar devices, and relates more especially to improved means for controlling the position of the gin front, the latter including among other elements the roll box, float roll and grate-fall. In accordance with usual practice, the gin front is hinged to swing toward or from the gin proper, such arrangement being necessary for various reasons, for instance, to give access to the saw cylinder or to retract the roll box and grate-fall from the saw cylinder when the supply of cotton to the roll box ceases, or when, under certain circumstances, the saw cylinder becomes loaded with undoffed lint. Usually the motion of the gin front toward or from operative or ginning position has been accomplished by the manual actuation of a lever, this lever being fixed to a rock shaft which extends transversely across the gin front and which is provided at each end with motion transmitting means, for instance a toggle linkage whereby rocking of the shaft swings the gin front forwardly and holds it locked in this position until purposely restored to its operative position by reverse motion of the lever.

The gin front is a heavy structure requiring the application of substantial force for moving it, and when an operator is required to tend a plurality of gins the moving of the gin fronts in and out as often as is necessary to insure optimum performance of the gin becomes very laborious. It has been proposed to employ some type of power-driven actuator for thus moving the gin front out or in, for instance, a fluid pressure motor, and also to provide a remote control for such power actuator, thereby to make it possible for a single attendant readily to care for a substantial number of gins. However, most such prior proposals have involved the use of complicated and expensive apparatus not readily applicable to all types of gin, and which demand, for their continued dependable operation a degree of mechanical skill which the available attendant may not possess.

One of the objects of the present invention is to provide power actuated means of simple and relatively inexpensive type, comprising but few moving parts, whereby the gin front may be moved toward or from operative position in a dependable way and without requiring the expenditure of fatiguing labor or the possession of a high degree of skill by the operator. A further object is to provide power actuated means for moving a gin front, which is applicable to gins, provided with the usual manually actuable means for moving the gin front, but which does not prevent manual operation when desired. A further object is to provide means for moving a gin front into or out of operative position which may be controlled from a point remote from the individual gin, thus making it possible for a single attendant, stationed at a convenient point, to manipulate the fronts of an entire battery of gins. A further object is to provide power driven means for moving the gin front in or out without interfering with automatic outward movement of the gin front in direct response to the accumulation of an excessive amount of lint on the saw cylinder. A

2 further object is to provide means for moving a gin front in or out which comprises an electric motor so designed that it will stop automatically after its shaft has turned through an arc of substantially predetermined extent. A further object is to provide means for moving a gin front in or out comprising a single phase electric motor so designed that it will start in response to the closing of a switch and will stop in response to a rotary cam which turns in time with the motor shaft, after the cam has turned through an angle of approximately 180°, and which is so designed as to provide a braking effect which will prevent the cam from moving (after the current has been cut off from the motor) more than a few degrees beyond the desired stopping position. Other and further objects and advantages of the invention will be pointed out in the following more detailed description and by reference to the accompanying drawings, wherein Fig. 1 is a diagrammatic right-hand end elevation of a gin of a commercial type with certain parts broken away and embodying the control mechanism of the present invention, the gin front being shown in its "in" or operative position;

Figure 1:
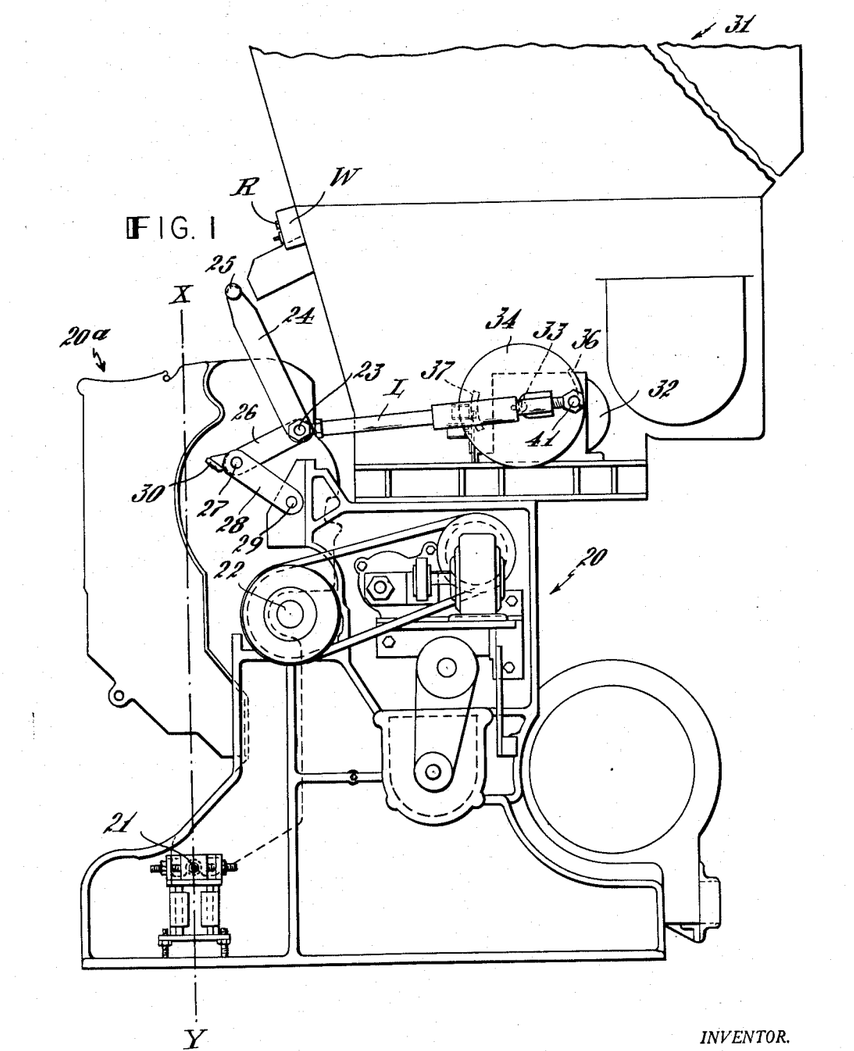

Referring to the drawings, the numeral 20 (Fig. 1) indicates, in general, a cotton gin of commercial type, this gin comprising the front 20a which is hinged to swing outwardly away from the gin proper about a hinge connection whose horizontal axis is indicated at 21 and lies in the vertical plane X—Y. In the gin here illustrated the gin front 20ª is so designed that when it is in the "in" or operating position (Fig. 1) its center of gravity lies just to the right of the vertical plane X—Y, so that the gin front tends to remain in this position until force be applied such as to cause the center of gravity to move to the left of the plane X—Y. Such a force may result from the accumulation of undoffed lint on or between the saws of the saw cylinder, such as sometimes occurs when the lint discharge flue from the gin becomes clogged, to an extent such that the mass of lint presses against the lower part of the grate-fall, thus exerting force in a counterclockwise direction as respects the axis 21 of the gin front, and so swinging the gin front out of operative position. While certain features of the control mechanism of the present invention (hereinafter more fully described) are particularly useful when the gin front is capable of such automatic response to an undue accumulation of lint on the saw cylinder, the invention in its broader aspects is not necessarily confined to a gin of this specific type.

Figure 1A:
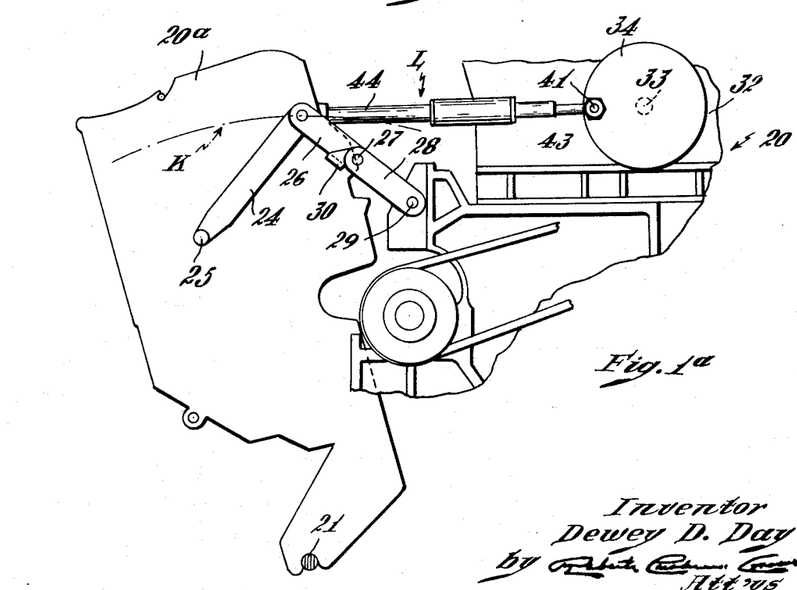
Fig. 1a is a fragmentary view similar to Fig. 1, showing the gin front in the "out" or inoperative position with the control mechanism correspondingly disposed.
Figure 2:
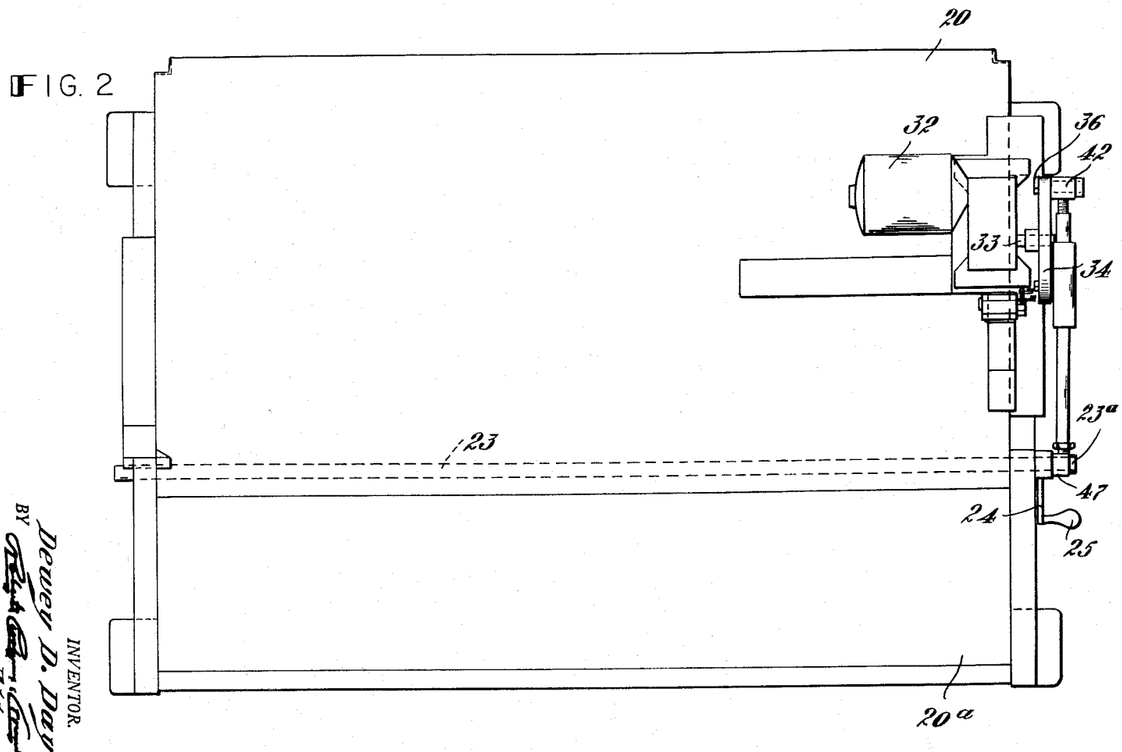
Fig. 2 is a diagrammatic plan view of the gin shown in Fig. 1.
Figure 3:
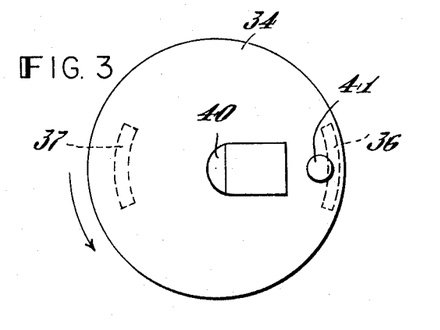
Fig. 3 is a face view of a crank disk forming an element of the control mechanism, the disk being viewed from the same point as it is seen in Fig. 1.
Figure 4:
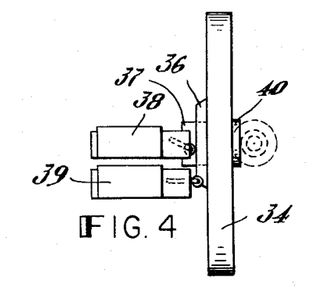
Fig. 4 is a front edge view of the crank disk of Fig. 3, also showing certain switches which are controlled by cams carried by the disk.

The shaft of the saw cylinder is indicated at 22. A shaft 23, parallel to the shaft 22, extends transversely across the gin front, being journaled in suitable bearings, and a manually actuable lever 24, having a handle 25, is fixed to this shaft 23 near one end. At each side of the gin a toggle linkage is arranged to be operated by the rock shaft 23. Each toggle linkage comprises an arm 26 fixed to the shaft 23 and pivotally connected at 27 to a lever 28 pivoted at 29 to a fixed part of the gin frame. Desirably the lever 28 is provided with a stop member 30 which when the gin front is moved to the extreme "out" position by actuation of the hand lever 24, underlies the edge of the arm 26 and thus holds the toggle linkage locked, with the point 27 at or beyond the dead center. However, when the gin front is moved out by the automatic means hereafter described, the toggle linkage does not reach dead center and the stop 30 is inactive. The arrangement, comprising the shaft 23, the lever 24 and the toggle linkage, is commonly in use in gins of this general type, it being noted that when the lever 24 is rocked the action of the toggle linkage is to cause the shaft 23 to move bodily in an arc K (Fig. 1ª) whose center is the axis 21 around which the gin front swings.

Figure 5:
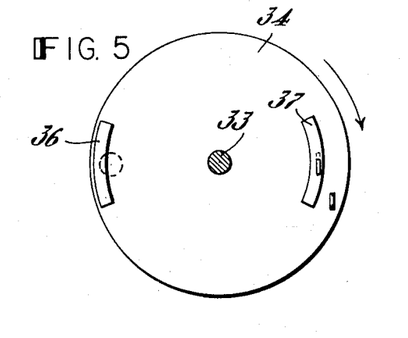
Fig. 5 is a face view similar to Fig. 3, but showing the opposite face of the crank disk.
Figure 6:
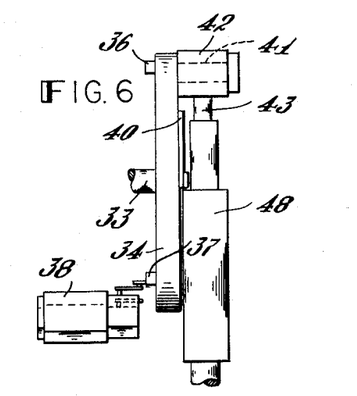
Fig. 6 is a plan view of the crank disk of Fig. 3, showing switches and other elements which are operated by cams on the disk.

In accordance with the present invention, means other than the toggle linkage is provided for swinging the gin front in or out, and for this purpose a motor 32 is mounted on a convenient portion of the gin frame and by means of a suitable reduction gearing drives a shaft 33 at an angular velocity substantially less than that of the motor shaft. A crank disk 34 is fixed to the outer end of the shaft 33. This disk 34, as more clearly shown in Figs. 3 to 6 inclusive, is provided on its inner face, that is to say, its left-handed face, as viewed from the front of the gin, with two segmental cams 36 and 37 (Figs. 1 and 5), these cams being disposed at diametrically opposite portions of the disk and with the cam 36 located nearer the periphery of the disk than the cam 37.

The motor 32 which drives the shaft 33 is desirably of the type which includes a built-in speed reducer. One appropriate motor useful for the purpose is the motor sold by Boston Gear Works (Quincy, Massachusetts), Model No. MW121–100, having a rated horse power of one-third, and in which the reduction gearing is such that the shaft 33 makes 17.5 revolutions per minute, with the motor shaft turning at 1750 r.p.m. This motor is of the single-phase, capacitor type having what is commonly known as a running winding and also a starting winding, the latter being in series with a capacitor and being connected, through a centrifugal switch within the motor, in parallel with the running winding. The purpose of the starting winding in such a motor is to produce a rotating magnetic field during motor starting, which causes the rotor to develop starting torque. The starting winding produces this rotating magnetic field because of the quadrature location of this winding with reference to the main winding, and because its current, as developed by the winding design and capacitor, is different in time phase with respect to the main winding. After the motor has reached normal operating speed the centrifugal switch within the motor automatically opens, so that current is then supplied only to the running winding. With such a motor connected into the supply circuit, in accordance with customary practice, the motor shaft will continue to turn by reason of its momentum after the power is cut off and before the centrifugal switch closes, so that before the crankshaft 33 of the present device would stop, it would have turned approximately 90°. This would not be permissible in the apparatus herein disclosed, because for proper operation it is necessary that the shaft 33 and the crank disk 34 stop approximately at the end of each 180° rotation. In accordance with the present invention, the motor is made to stop much more quickly than it ordinarily would by short-circuiting the centrifugal switch at the very instant the current is cut off from the motor, and while the centrifugal switch is still open. The result is to produce an electrical braking action, the motor acting as a self-excited induction generator whenever the supply current is cut off and the capacitor is connected in parallel with the motor windings and the shaft continues to turn. Since the capacitor provides a leading component of current which acts as exciting current, the motor will generate voltage so long as its shaft continues to turn, and this generator action involves losses which result in the rapid deceleration of the motor. With this arrangement, the motor shaft stops so quickly after the current is cut off that the shaft 33 may be depended upon to stop at the end of each 180° of rotation ±5°.

Figures 10, 10A, 10B, 10C:
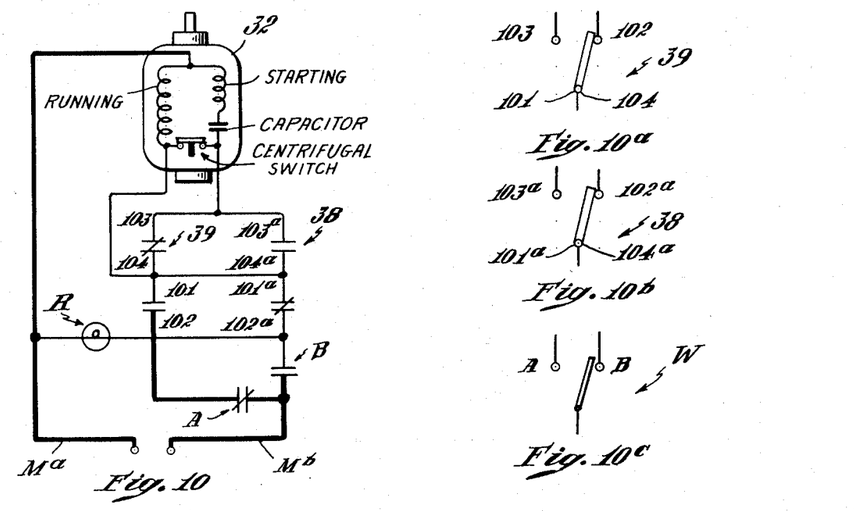
Fig. 10 is a wiring diagram showing the circuit of the control motor when the gin front is in the open position and the motor for actuating the gin front is stopped.
Figs. 10a and 10b are diagrams illustrating the two limit switches which are employed for controlling the motor circuit.
Fig. 10c is a digram illustrating the manually actuable switch which is employed for closing the motor circuit to start the motor which actuates the gin front.

A pair of switches 38 and 39 (Figs. 10ª and 10ᵇ) is mounted on the gin frame in such location that as the disk 34 turns, one or the other switch will be operated by the contact of the corresponding cam 36 or 37 with the actuating element of the respective switch. These switches are of a type hereinafter more fully described. The switch-actuating element may be a roller or a push-button or any other customary device whereby the contacts of an electric switch may be relatively moved.

The disk 34 is provided at its right-hand face (Fig. 4), as viewed from the front of the gin, with another cam 40, whose purpose will be indicated hereinafter, and it is also provided with a crankpin 41 projecting from the same face of the disk as the cam 40, and as here shown, on a diameter of the disk which bisects the cam segments 36 and 37.

Figure 7:
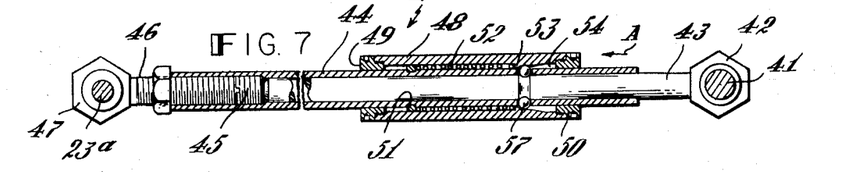
Fig. 7 is a section, partly broken away, in a vertical diametrical plane through a toggle-actuating link constituting an element of the control mechanism of the present invention, the parts being shown in the relative positions which they occupy when the gin front is in the "out" or inoperative position.
Figure 8:
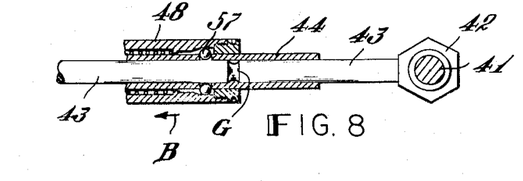
Fig. 8 is a fragmentary view showing the right-hand portion of the link of Fig. 7, but indicating the relative positions of the parts when the gin front is in the "in," operating or ginning position.

Referring to Figs. 7 and 8, the character L designates a link designed to transmit motion from the crankpin 41 to the shaft 23 above described, it being recalled as above noted, that bodily motion of the shaft 23 about the axis 21 results in swinging the gin front toward or from operative position. With this power driven means for operating the gin front, the gin front would be locked in the ginning position by the drive connection (the drive motor being stopped) and could not move to "out" position in response to abnormal internal pressure in the gin were the link to be of fixed length. As here shown, the link L comprises a rigid rod 43 provided at one end with a sleeve 42 which receives the crankpin 41. The rod 43 is telescopically slidable within an elongate sleeve 44, which as shown in Fig. 7 is desirably provided at its left-hand end portion with internal screw threads which receive an adjustable stop member 45 engageable with the left-hand end of the rod 43 thereby to determine the minimum effective length of the link. Within the same screw-threaded end of the sleeve 44 there is arranged a screw-threaded plug 46 provided with a sleeve 47 which receives an axial extension of the shaft 23, as indicated at 23ª (Fig. 7).

A latch sleeve 48 of an internal diameter exceeding the external diameter of sleeve 44 is telescoped over the sleeve 44—this latch sleeve being provided with internal plugs 49 and 50 at its opposite ends having axial bores of a diameter to provide an easy sliding fit on the sleeve 44. The sleeve 48 is of an internal diameter between its end plugs sufficiently greater than the external diameter of the sleeve 44 to admit a compression spring 52 to be installed between the sleeves. The sleeve 44 is provided with a peripheral groove which receives a snap ring 51 constituting an abutment for one end of the compression spring, while the interior of the latch sleeve 48 is provided with an inwardly directed annular shoulder 53 forming an abutment for the other end of the spring. The spring thus tends to hold the sleeves 44 and 48 in the relative position shown in Fig. 7, but permits the sleeve 48 to slide in the direction of the arrow A (Fig. 7) in response to force applied to the plug 50.

Figure 7A:
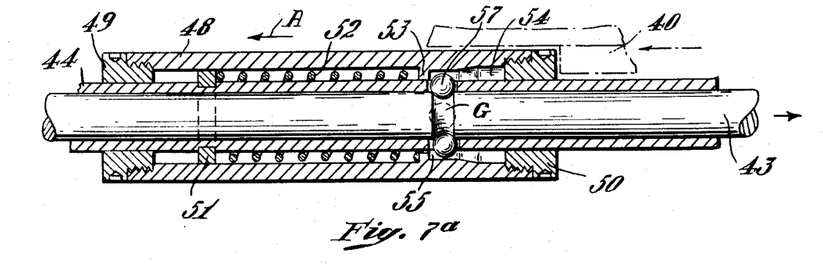
Fig. 7a is a fragmentary section, on the same plane as Fig. 7, but to larger scale, better to illustrate certain structural details.

The rod 43 is provided with a peripheral groove G (Fig. 7a), and the sleeve 48 is provided with a chamber 54 intermediate the shoulder 53 and the plug 50—this chamber 54 being of greater diameter at its right-hand end portion than at its left-hand end portion, the portion 55 of smaller diameter merging smoothly with the portion of larger diameter. The sleeve 44 is provided with circumferentially spaced peripheral openings, and when the sleeves 44 and 48 occupy the relative positions shown in Fig. 7, ball bearings 57 seat in the groove G and project through the corresponding openings in the sleeve 44, and contact the wall of the small diameter portion 55 of the chamber 54. In this position of the parts, which corresponds to that at which the gin front is in the out or inoperative position, it is not possible for the rod 43 to move to the right relatively to the sleeve 44 because of the engagement of the balls 57 with the walls of the openings and with the groove G. However, if force be applied to the plug 50 in the direction of the arrow A (Fig. 7) the latch sleeve 48 is thereby moved to the left until the larger portion of the chamber 54 is brought opposite to the ball bearings 57. Under these circumstances, if force be applied to the sleeve 44 in the direction of the arrow B (Fig. 8), the sleeve 44 is free to move to the left relatively to rod 43, since the ball bearings are now free to move out from the groove G.

When the gin front is in the out or inoperative position, the disk 34 is so located that the cam 36 is so positioned relative to switch 39 that the motor circuit is broken and the gin front remains in this position until the circuit is closed by the manual closing of a suitable switch. While the disk 34 is in this position, the cam 40 is so located that it does not contact the plug 50, and thus the parts of the link L occupy the relative positions shown in Fig. 7, the link L now being of fixed length, so that any motion of the crankpin 41 is transmitted to the gin front through the shaft 23. When the gin front is in the operative or ginning position, the cam 37 is so positioned relatively to switch 38 that the motor circuit is again broken, but at this time the cam 40 is in contact with the plug 50 and is holding the latch sleeve 48 in the position indicated in Fig. 8, so that the link L is free to extend. Thus, while the gin is in operation, if the saw cylinder becomes overloaded with lint so as to exert abnormal pressure against the grate-fall, the link L freely extends to allow the shaft 23 to move bodily so that the gin front automatically rocks to the out position. Thus the provision of the power means for moving the gin front in and out according to the present invention does not interfere with the automatic movement of the gin front in response to abnormal loading of the saw cylinder.

Obviously, when the gin front is in the operative or ginning position, it may be moved to inoperative position by manual actuation of lever 24.

When the cam 40 is retracted from the plug 50 on the next partial rotation of the disk 34, the spring 42 restores the sleeve 48 to the position of Fig. 7, and in so doing the balls 57 move over to the narrower part of the chamber 54 and drop into the groove G, thus again locking the link L at its normal length.

The manually actuatable starting switch W (Figs. 1 and 10c) is of the single-pole, double-throw type having contacts A and B by means of which either of two different circuits may be closed.

The switches 38 and 39 are of the single-pole, double-throw type. The switch 39 (Fig. 10a) has the contacts 101, 102 and the contacts 103, 104, while the switch 38 (Fig. 10b) has the contacts 101a, 102a, and the contacts 103a, 104a. When the actuator of switch 39 is engaged by the cam 36, the contacts 101 and 102 are open, while the contacts 103 and 104 are closed, but when the cam 36 disengages the switch actuator, the switch automatically returns by spring action to the position in which contacts 101 and 102 are closed and contacts 103 and 104 are open. Likewise, when the actuator of switch 38 is engaged by the cam 37, contacts 101a and 102a are open, while contacts 103a and 104a are closed, but when the cam 37 disengages the switch actuator the switch automatically returns by spring action to the position in which contacts 101a and 102a are closed, and contacts 103a and 104a are open.

Figure 9:
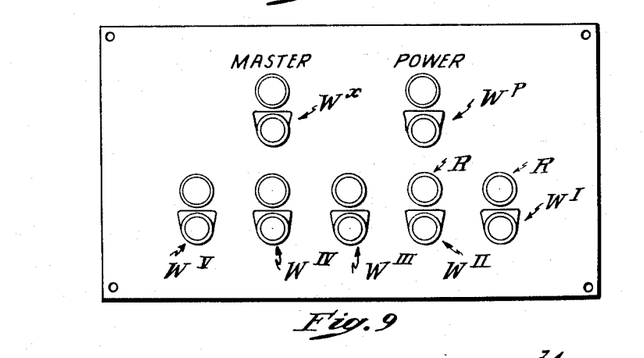
Fig. 9 is a front elevation of a control panel useful in connection with the apparatus of the present invention and designed for controlling the fronts of the gins of a battery of five gins.

In Fig. 9 there is illustrated a control panel such as is useful when gins are arranged in a battery and whereby an attendant, located at a convenient point, may control any or all of the gins of the battery. The panel shown in Fig. 9 is arranged for the control of five gins. On this panel there is arranged a row of switches $W^I$, $W^{II}$, $W^{III}$, $W^{IV}$, $W^V$, each corresponding to one of the gins and each having associated with it a red lamp R which is lighted when the gin front is in operative position. On the same panel there is arranged a master switch indicated by the character $W^x$, with an associated red light, and also a switch indicated by the character $W^p$, with its associated red light. This latter switch may control the current for operating the several gins of the battery, so that all of the gins may be started or stopped at once if desired. The switch $W^x$ is designed to control the front of all of the gins of the battery. When this switch is turned to the "open" position, the fronts of all of the gins of the battery will be in the non-ginning position. When this switch $W^x$ is turned to the "close" position, current is made available for operating the gin fronts of each gin of the battery, and then each respective gin front may be controlled by the operation of its individual switch $W^I$, $W^{II}$, $W^{III}$, etc.

A complete cycle of operation of the apparatus of the present invention, starting with the gin front in open or inoperative position, comprising moving the gin front into the "in" or ginning position, and moving the gin front back from ginning to the inoperative position, involves seven different arrangements of the electrical circuit which are diagrammatically illustrated respectively in Figs. 10 to 16. In these views the various switches are shown in their open and closed positions according to conventional mode, and the portion of the circuit which at any time is energized is indicated in heavier lines. The types of switch which are preferably employed are diagrammatically illustrated in Figs. 10a, 10b and 10c—the switch W being the manually actuable motor starting switch and the switches 38 and 39 being cam-actuated stopping or limit switches.

Fig. 10 shows the motor stopped with the gin front in the open or inoperative position. At this time the actuator for switch 39 is engaged by cam 36, but the cam 37 does not contact the actuator for switch 38. Supply conductors for the motor circuit are indicated at Ma and Mb, the wire Ma being connected to both the running and starting windings of the motor. The wire Mb may be manually connected to either of the contacts A or B of switch W, but is shown in Fig. 10 as connected to contact A. However, contacts 101 and 102 of switch 39 are open and thus the motor circuit is broken so that the parts are at rest.

Figure 11:
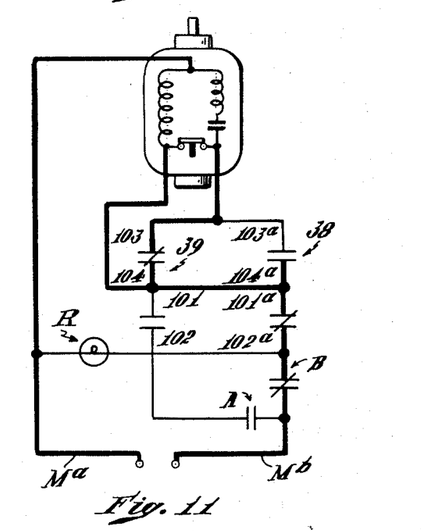
Figs. 11 to 16, inclusive, are diagrams similar to Fig. 10, but showing the circuit of the control motor at various stages of the operation.

Fig. 11 shows the manually actuable switch W as having been moved to connect supply conductor Mb to the contact B. Current is now supplied to both motor windings and the motor 32 has just started, but is not up to speed so that the centrifugal switch is closed. The switches 38 and 39 are still in the position shown in Fig. 10. It will be noted that at this time current is being supplied to the indicator lamp R, and also (through the normally closed contacts 101a and 102a of limit switch 38 and 103 and 104 of switch 39) to the windings of the motor.

Figure 12:
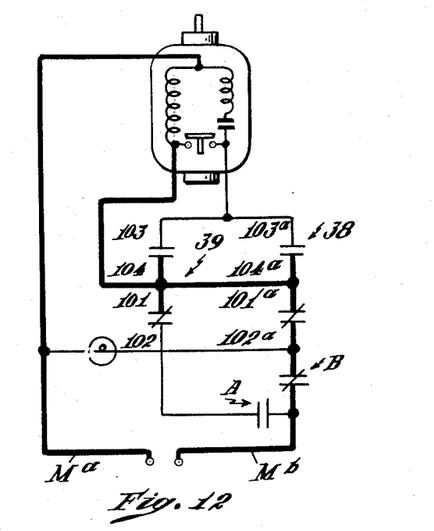

Fig. 12 shows the situation when the motor 32 is up to speed; the centrifugal switch has opened; the crank disk 34 has turned until cam 36 has disengaged the actuator for the switch 39, so that the circuit is now closed between contacts 101 and 102, open between contacts 103 and 104 and still closed between contacts 101a and 102a. Cam 37 has not contacted the actuator for switch 38, and the gin front is nearing the "in" or ginning position. As the centrifugal switch is open the starting winding is out of the circuit and the motor 32 operates at full speed.

Figure 13:
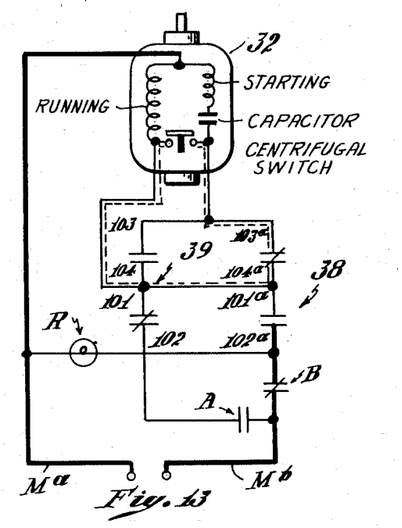

Fig. 13 shows the circuit condition which exists after the gin front has reached the fully closed or ginning position. Switch 39 is still in the same position as shown in Fig. 12, but cam 37 engaged the actuator of switch 38 just as the gin front reached the closed position, so that the contacts 101a and 102a of switch 38 open, while contacts 103a and 104a of the same switch are closed. Thus current is at once cut off from the supply, but the momentum of the running parts causes the motor shaft to continue to turn. Current is still supplied to the lamp R. As soon as contacts 101a and 102a separated, current was cut off from the motor, but at the same instant the closing of contacts 103a and 104a completed a circuit indicated by the dotted lines in Fig. 13, short-circuiting the centrifugal switch which is still open because the motor speed has not at this time dropped sufficiently to allow the centrifugal switch to close. The establishment of this internal circuit shown by the dotted lines in Fig. 13 causes the motor to act as a self-excited induction generator, producing a voltage which results in so rapid a deceleration of the motor that the rotation of the disk 34 ceases within a few degrees, for example 5°, after the tripping of the switch 38 by the cam 37.

Figure 14:
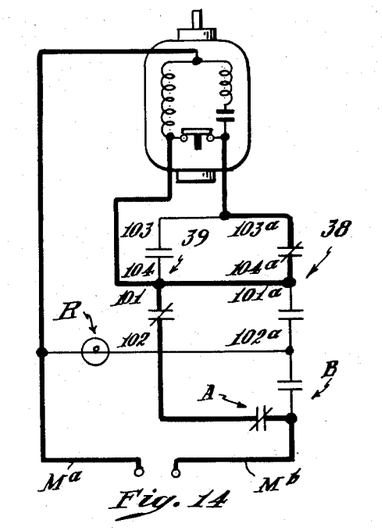

Fig. 14 shows the electrical circuit resultant from the manual actuation of the switch W such as to connect the contact A with the supply, thereby to move the gin front to open position. This starts the motor and begins to move the crank pin 41 from the position of Fig. 1 to the diametrically opposite position (Fig. 1a), but as shown in Fig. 14, the motor is not yet up to speed and the centrifugal switch is closed. The actuator for limit switch 39 has not been contacted by its cam 36 and the contacts 101 and 102 of the latter are closed, but the actuator for limit switch 38 is engaged by its cam 37 and contacts 101a and 102a are open. Current is now supplied to both windings of the motor, since switch W is closed through contact A, and since switch 38 is also closed at the contacts 103a and 104a, a circuit thus being established through both windings of the motor, so that the motor shaft starts to rotate and thus begins to move the gin front toward the open position.

Figure 15:
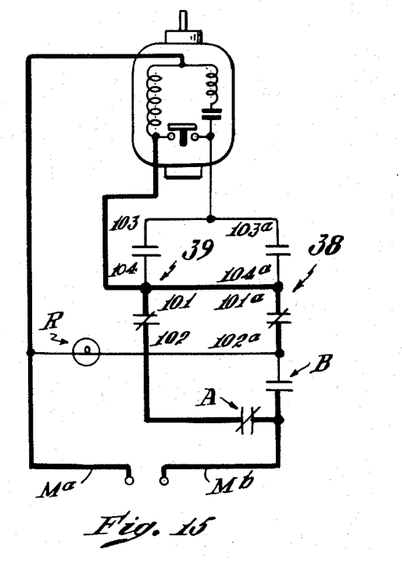

Fig. 15 shows the electrical circuit as the gin front is moving toward the open position and after the motor shaft has attained full speed. During the initial turning of the motor shaft the cam 37 disengaged the actuator for switch 38, so that contacts 103a and 104a are now open and contacts 101a and 102a are closed. As the motor shaft attained full speed the centrifugal switch opened. Current is now supplied to the running winding of the motor, but is cut off from the starting winding.

At this time the contacts of limit switch 39 are still in the same position as shown in Fig. 14.

Figure 16:
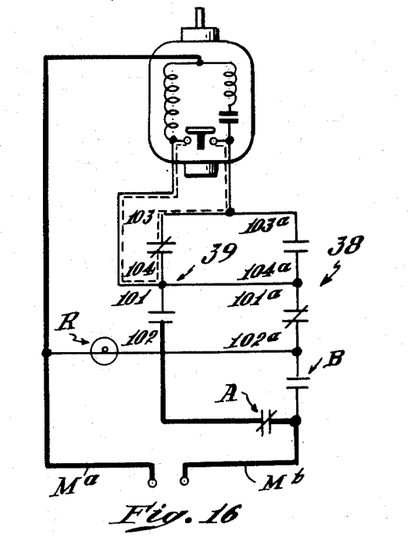

Fig. 16 shows the electrical circuit at the instant when the gin front has reached the fully open position. The circuit is still closed at contact A of switch W. The actuator for limit switch 39 has been engaged by the cam 36, and the contacts 101 and 102 of switch 39 are open while the contacts 103 and 104 of this switch are closed. The contacts of switch 38 still remain as shown in Fig. 15. However, although the switch W is closed at contact A, no current is supplied to the motor, since as noted, the contacts 101 and 102 are open, but since contacts 103 and 104 of switch 39 are now closed, the centrifugal switch is short-circuited within the motor, as shown by the dotted line in Fig. 16. Under these conditions the motor again acts as a self-excited induction generator so long as the motor continues to run by reason of the momentum of its parts, and voltage is thus generated within the motor windings, with the result that the motor is rapidly decelerated. Thus when the switch 39 is actuated by the cam 36, the crank disk 34 is stopped within a few degrees.

While one desirable embodiment of the invention has herein been disclosed by way of example, it is to be understood that the invention is broadly inclusive of any and all modifications and equivalents falling within the scope of the appended claims.

I claim:

1. In a cotton gin of the kind which has a movable front, a power-driven saw cylinder, and means for moving the front from an open, operative position to a closed or inoperative position and vice versa, said front-moving means comprising a motor mounted on the frame of the gin and which is normally de-energized, and means operative to transmit motion from the motor to the movable front but only so long as the motor is energized, characterized in that said motion-transmitting means is operative to permit the front to move to open position, in response to abnormal pressure exerted against its inner surface, while the motor is de-energized.

2. In a cotton gin of the kind which has a movable front hinged to swing about an axis which extends transversely of the gin, a power-driven saw cylinder, means for moving the gin front from an operative, closed position to an inoperative, open position and vice versa, said front-moving means comprising an electric motor having a shaft, means for transmitting motion from the motor shaft to the gin front, and means for starting and stopping the motor, characterized in that the motion-transmitting means is so constructed and arranged as to permit the gin front to move from operative to inoperative position, in response to pressure exerted upon its inner surface, while the motor shaft is stationary.

3. In a cotton gin of the kind which has a movable front hinged to move about an axis extending transversely of the gin, and manually actuable means for moving the gin front from the closed to the open position, in combination, a crankshaft and a crankpin carried thereby, a link connecting the crankpin to the movable gin front, and which is operative, while the crank pin is turning, to transmit motion from the crank pin to the gin front but which is inoperative to prevent motion of the gin front independently of the crank pin when the latter is stationary, and motor means operative to turn the crankshaft through an angle of approximately 180° and then to stop, thereby to move the gin front toward or from operative position respectively; the link being so constructed and arranged as to permit manual opening of the gin front while the motor is stopped.

4. The combination according to claim 3, wherein the hinge axis about which the gin front moves is so located that the center of gravity of the movable gin front is above said axis and is normally disposed between the gin proper and a vertical plane through said axis whereby the gin front tends to remain in closed or operative position by gravity action, further characterized in that the link which transmits motion from the crankpin to the gin front is freely extensible when the front is in the closed or operative ginning position and the crankshaft is stationary thereby permitting the gin front automatically to move to open or inoperative position in response to abnormal pressure exerted against the inner side of the gratefall of the gin.

5. In a cotton gin of the kind which has a movable front hinged to move about an axis extending transversely of the gin, and manually actuable means for moving the gin front from the closed to the open position, in combination, a crank shaft and a crank pin carried thereby, a link connecting the crank pin to the movable gin front, and motor means operative to turn the crank shaft through an angle of approximately 180° and then to stop, thereby to move the gin front toward or from operative position respectively; the link being so constructed and arranged as to permit manual opening of the gin front while the motor is stopped, but being inextensible when the gin front is in the open or inoperative position and the crank-shaft is stationary.

6. The combination according to claim 3, further characterized in that the link includes relatively slidable end portions, means for locking said end portions in such relative position that the link is of maximum effective length, means operative automatically to release said locking means when the front is in the operative position and the motor-driven crank shaft is stationary thereby to permit the link to shorten and so allow the gin front to open in response to abnormal pressure against its inner surface, and means operative automatically to actuate said locking means thereby to maintain the link at its maximum length, in response to the starting of the motor, for moving the gin front from closed to open position.

7. In a cotton gin of the kind which has a movable front hinged to move about an axis extending transversely of the gin, and manually actuable means for moving the gin front from the closed to the open position, in combination, a crank shaft and a crank pin carried thereby, a link connecting the crank pin to the movable gin front, and motor means operative to turn the crank shaft through an angle of approximately 180° and then to stop, thereby to move the gin front toward or from operative position respectively; the link being so constructed and arranged as to permit manual opening of the gin front while the motor is stopped, and the hinge axis about which the gin front moves is so located that the center of gravity of the movable gin front is above said axis and is normally disposed between the gin proper and a vertical plane through said axis whereby the gin front tends to remain in closed or operative position by gravity action, further characterized in that the link which transmits motion from the crank pin to the gin front is freely extensible when the front is in the closed or operative ginning position and the crank shaft is stationary thereby permitting the gin front automatically to move to open or inoperative position in response to abnormal pressure exerted against the inner side of the gratefall of the gin, and wherein the link which transmits motion from the crankpin to the gin front comprises relatively movable telescopic parts, means normally operative to lock said parts whereby the link is of fixed predetermined length, and means automatically operative, but only when the gin front is in the operative or ginning position, to release said locking means thereby to permit relative motion of said telescopic parts.

8. The combination according to claim 7, wherein the means for releasing the locking means comprises a cam which moves in time with the crankshaft.

9. The combination according to claim 7, wherein the means for locking the telescopic parts to prevent relative motion thereof comprises a ball which normally seats in a depression in the inner of said telescopic parts and which at the same time engages an opening in the outer of said telescopic parts, latch means normally retaining the ball in said position, and means operative to retract said latch means thereby to permit the ball to disengage the outer of said telescopic parts.

10. The combination of claim 9, wherein the means for retracting the latch means comprises a cam which moves in time with the crankshaft and which operatively engages the latch means only when the gin front is in the ginning position.

11. In a cotton gin of the kind which has a movable front hinged to move about an axis extending transversely of the gin, and manually actuable means for moving the gin front from the closed to the open position, in combination, a crank shaft and crank pin carried thereby, a link connecting the crank pin to the movable gin front, and motor means operative to turn the crank shaft through an angle of approximately 180° and then to stop, thereby to move the gin front toward or from operative position respectively, the link being so constructed and arranged as to permit manual opening of the gin front while the motor is stopped, wherein the link comprises relatively slidable parts and means operative, at times, so to lock said parts together that the link is rigid and of maximum effective length, and an electric motor is employed for turning the crankshaft, means providing a circuit for supplying current to the motor, and means actuable by the crankshaft to break the motor circuit when the gin front is in operative or inoperative position respectively, and a part which turns with the crankshaft, and which is operative to hold said locking means in inoperative position when the gin front is closed and the motor circuit is broken.

12. In a cotton gin of the kind which has a movable front hinged to move about an axis extending transversely of the gin, and manually actuable means for moving the gin front from the closed to the open position, in combination, a crank shaft and a crank pin carried thereby, a link connecting the crank pin to the movable gin front, and motor means operative to turn the crank shaft through an angle of approximately 180° and then to stop, thereby to move the gin front toward or from operative position respectively, the link being so constructed and arranged as to permit manual opening of the gin front while the motor is stopped, an electric motor for turning the crank shaft, means providing a circuit for supplying current to the motor, and means actuable by the crank shaft to break the motor circuit when the gin front is in operative or inoperative position respectively, a pair of independent limit switches in said supply circuit, cam means moving in time with the crank shaft operative to actuate one or the other of said limit switches respectively, thereby to break the motor circuit when the gin front is in operative or inoperative position respectively, and a manually actuable switch for completing the motor circuit thereby to start the motor, wherein each of the circuit controlling switches is a single-pole, double-throw switch, the switches being so arranged that one pair of contacts of each respective switch is closed when the other pair of contacts of said switch is open, and two cams, moving in time with the crankshaft, one of which is operative to actuate one switch and the other of which is operative to actuate the other switch thereby to break the motor circuit, and manually actuable means for completing the motor circuit thereby to start the motor.

13. In a cotton gin of the kind which has a movable front, a rotatable motor-driven shaft, means for transmitting motion from said shaft to the gin front thereby to move the latter from open to closed position and vice versa, said motion-transmitting means comprising parts which, at times, are relatively movable, and means operative, at times, to lock said parts together to form a rigid structure, means for turning said shaft comprising a capacitor type motor having a running winding, a starting winding, a capacitor in series with the starting winding, and a normally closed centrifugal switch operative to cut off current from the starting winding when the motor has attained a predetermined speed, a control switch for determining the supply of current from an external source to the running winding of the motor, in combination, means operative to short-circuit the centrifugal switch immediately upon opening of the control switch thereby quickly to stop the motor, and a part which is actuable by said motor-driven shaft and which is operative to maintain said locking means in inoperative position when the gin front is closed and the motor driven shaft is stationary.

14. The combination according to claim 13, wherein the means for short-circuiting the centrifugal switch comprises a third switch which, when closed, re-establishes a circuit through the starting winding, and means operative to close said third switch concomitantly with the opening of the control switch.

15. In a cotton gin of the kind which has a movable front, a rotatable motor-driven shaft, means for transmitting motion from said shaft to the gin front thereby to move the latter from open to closed position and vice versa, said motion-transmitting means comprising parts which, at times, are relatively movable, and means operative, at times, to lock said parts together to form a rigid structure, means for turning said shaft comprising a capacitor type motor having a running winding, a starting winding, a capacitor in series with the starting winding, and a normally closed centrifugal switch operative to cut off current from the starting winding when the motor has attained a predetermined speed, switch means which is operative to break the circuit through the running winding and concomitantly to re-establish a circuit through the running winding even though the centrifugal switch is open, means operative automatically to actuate said switch means when the gin front completes its motion toward operative position, and a cam which turns with the motor-driven shaft and a part which is actuable by said shaft and which is operative to maintain said locking means in inoperative position when the gin front is closed and the motor-driven shaft is stationary.

16. In a cotton gin of the kind which has a movable front, a rotatable motor-driven shaft, means for transmitting motion from said shaft to the gin front thereby to move the latter from open to closed position and vice versa, said motion-transmitting means comprising parts which, at time, are relatively movable, and means operative, at times, to lock said parts together to form a rigid structure, means for turning said shaft comprising a capacitor type motor having a running winding, a starting winding, a capacitor in series with the starting winding, and a normally closed centrifugal switch operative to cut off current from the starting winding when the motor has attained a predetermined speed, switch means which is operative to break the circuit through the running winding and concomitantly to re-establish a circuit through the running winding even though the centrifugal switch is open, means operative to actuate said switch means when the gin front completes its motion toward open position, and a part which is actuable by said motor-driven shaft and which is operative to maintain said locking means in inoperative position when the gin front is closed and the motor-driven shaft is stationary.

17. In a cotton gin of the kind which has a movable front, a rotatable motor-driven shaft, means for transmitting motion from said shaft to the gin front thereby to move the latter from open to closed position and vice versa, said motion-transmitting means comprising parts which, at times, are relatively movable, and means operative, at times, to lock said parts together to form a rigid structure, means for turning said shaft comprising a capacitor type motor having a running winding, a starting winding, a capacitor in series with the starting winding, and a normally closed centrifugal switch operative to cut off current from the starting winding when the motor has attained a predetermined speed, a pair of independent switches, each of which is operative, at times to break the circuit through the running winding and to restore the circuit through the starting winding, even though the centrifugal switch be open, a pair of cams which turn in time with said motor-driven shaft, one of said cams being operative to actuate one of said switches when the gin front completes its motion toward operative position, and the other of said cams being operative to actuate the other of said switches when the gin front completes its motion toward open position, and a part which is actuable by said motor-driven shaft and which is operative to maintain said locking means in inoperative position when the gin front is closed and the motor-driven shaft is stationary.

18. In a cotton gin of the kind which has a movable front, a rotatable motor-driven shaft, means for transmitting motion from said motor-driven shaft to the gin front thereby to move the latter from open to closed position and vice versa, said motion-transmitting means comprising parts which, at times, are relatively movable, and means operative, at times, to lock said parts together to form a rigid structure, means for turning said shaft comprising a capacitor type motor having a running winding, a starting winding, a capacitor in series with the starting winding, and a normally closed centrifugal switch operative to cut off current from the starting winding when the motor has attained a predetermined speed, a reduction gearing through which force is transmitted from the motor to said shaft, the latter having thereon a crank disk and crankpin, a link which transmits motion from the crankpin to the gin front, a manually actuable switch for establishing a circuit through the running and starting windings of the motor, a pair of independent switches, each of which is operative, at times, to break the circuit through the running winding, and each of which is operative at times to re-establish the circuit through the starting winding even though the centrifugal switch is open, a pair of switch-actuating cams on the crank disk, one of said cams being so arranged that, as the gin front completes its motion toward operative position, it actuates one of said switches, and the other of said cams being operative, as the gin front completes its motion toward open position, to actuate the other switch whereby the motor is stopped quickly when the gin front arrives at either of said positions, and a part which is actuable by said motor-driven shaft and which is operative to maintain said locking means in inoperative position when the gin front is closed and the motor-driven shaft is stationary.

19. A cotton gin of the kind having a rockable front and means for moving said front to or from operative position, said means comprising a rotatable crankshaft carrying a crankpin, a link for translating rotary motion of the crankpin into rocking motion of the gin front, said link comprising relatively slidable parts and means operative, at times, to lock said parts together with the link at its maximum length, in combination, an electric motor for driving the crankshaft, said motor having a shaft, means for transmitting motion from the motor shaft to the crankshaft, means operative automatically to break the supply circuit to the motor when the gin front completes its motion either toward or from operative position, respectively, and means operative to generate a voltage in the motor windings, immediately upon the breakage of the supplying circuit, such as to apply retarding force to the motor shaft and thereby stop the motor quickly, and a cam which turns with the crank shaft, and which is operative, when the crank shaft is stationary and the gin front is closed, to maintain said locking means in inoperative position.

20. The combination according to claim 19, wherein the motion-transmitting means comprises a reduction gearing interposed between the motor shaft and the crankshaft, and the means for supplying the current comprises a cam which turns with the crankshaft and which actuates a switch in the supply circuit, and the means for generating voltage in the motor windings is such as to bring the crankshaft to rest within an arc of the order of 5° after the supply circuit is broken.

21. The combination according to claim 20, wherein the motor has a running winding and a starting winding, the latter being in series with a capacitor and wherein a normally closed centrifugal switch opens to break the circuit through the starting winding when the motor attains a predetermined speed, and the means for breaking the supply circuit comprises a switch so connected into the motor circuit that, when it is actuated to cut off current to the running winding, it concomitantly short-circuits the centrifugal switch thereby to build up voltage in the starting winding of the motor such as to bring the motor shaft quickly to rest.

References Cited in the file of this patent

UNITED STATES PATENTS

| | | |
|---|---|---|
| 1,167,714 | Pfau | Jan. 11, 1916 |
| 2,592,492 | Trant | Apr. 8, 1952 |
| 2,613,342 | Thompson et al. | Oct. 7, 1952 |
| 2,760,236 | Garrison et al. | Aug. 28, 1956 |
| 2,761,178 | Van Doorn et al. | Sept. 4, 1956 |
| 2,769,208 | Deems | Nov. 6, 1956 |